US00RE35664E

United States Patent [19]

Searle

[11] E Patent Number: Re. 35,664

[45] Reissued Date of Patent: Nov. 18, 1997

[54] FRICTION WELDING

[75] Inventor: John Gilbert Searle, Hednesford, England

[73] Assignee: Rolls-Royce plc, London, England

[21] Appl. No.: 387,222

[22] Filed: Feb. 10, 1995

Related U.S. Application Data

[63] Continuation of PCT/GB90/00678, May 3, 1990.

Related U.S. Patent Documents

Reissue of:

[64] Patent No.: 5,148,957
Issued: Sep. 22, 1992
Appl. No.: 780,461
Filed: Oct. 22, 1991

[30] Foreign Application Priority Data

May 6, 1989 [GB] United Kingdom ..... 8910452

[51] Int. Cl.[6] ..... B23K 20/12

[52] U.S. Cl. ..... 228/2.1; 228/55; 228/44.3

[58] Field of Search ..... 228/112.1, 114, 228/106, 2.1, 5.5, 44.3, 47.1, 212; 29/23.51, 889.21

[56] References Cited

U.S. PATENT DOCUMENTS 4,905,883 3/1990 Searle ..... 228/2
4,995,544 2/1991 Searle ..... 228/2

FOREIGN PATENT DOCUMENTS 0290134 11/1988 European Pat. Off. .
2085911 12/1971 France .
2157970 6/1973 France .
88/04213 6/1988 WIPO .

*Primary Examiner*—Samuel M. Heinrich
*Attorney, Agent, or Firm*—Christensen O'Connor Johnson & Kindness PLLC

[57] ABSTRACT

The present invention consists in the apparatus for use in welding a first component and a second component together by friction welding, comprising drive means operative to generate reciprocatory movement, a component holder operative to hold said first component, linking means operative to transmit reciprocatory movement from the drive means to the component holder so that in operation said first component performs reciprocatory heat-generating movement, pressure means operative to exert pressure on the component holder so that in operation said first component also performs welding movement, the linking means being such as to accommodate that welding movement during friction welding, and the pressure means being such as to accommodate that heat-generating movement during friction welding. The pressure means preferably comprises ram means operative to apply force to a non-reciprocating head which is connected to the component holder through flexible connecting means enabling heat-generating movement of the holder to be accommodated. The connecting means may comprise one or more hinged links but preferably comprises one or more flexible elements. These flexible elements may comprise flexible rods or bars but preferably comprise flexible blades so orientated as to prevent movement of the component holder in a direction transverse to its heat-generating movement. Movement of the head in a direction parallel with the reciprocatory heat-generating movement of the component holder is preferably resisted by guide means which nevertheless permits the head with the component holder to perform welding movement. The guide means is preferably constituted by roller means preloaded to prevent backlash or rattling in use.

6 Claims, 7 Drawing Sheets

Figure 1:
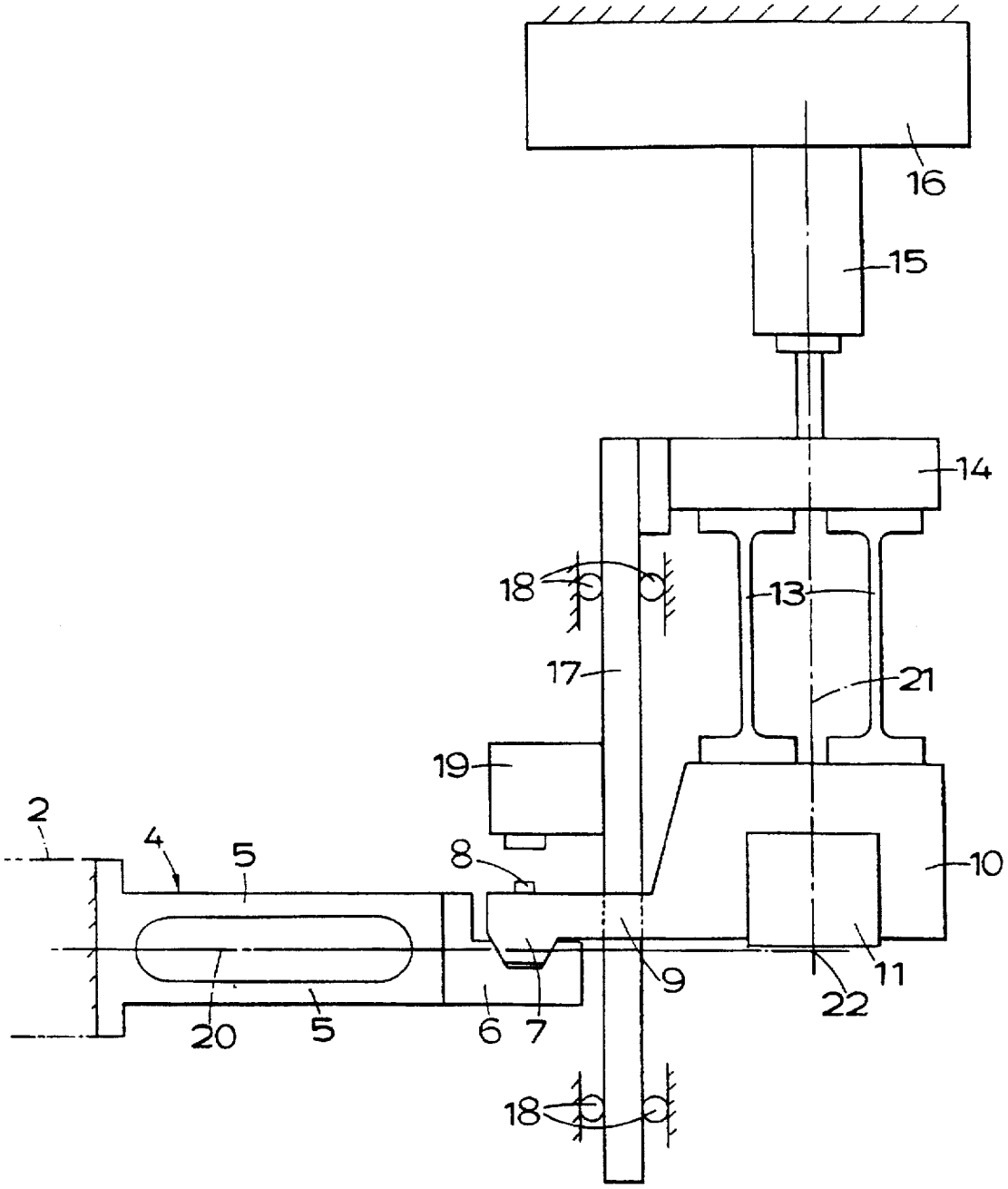

1
2
3
4
6
7
10
12
13
14
15
16
17
19
20
22
23
24
25
26
27
28
29
30
31
32
33
34
35
37
49
50
51

FRICTION WELDING

Matter enclosed in heavy brackets [ ] appears in the original patent but forms no part of this reissue specification; matter printed in italics indicates the additions made by reissue.

*This application is a continuation of prior copending international PCT application No. PCT/GB90/00678, filed on May 2, 1990, the benefit of the filing date which is hereby claimed under 35 U.S.C. § 120.*

This invention concerns friction welding. In particular the invention concerns friction welding of a kind which will be referred to herein as reciprocatory friction welding. In carrying out reciprocatory friction welding, two components that are to be welded together are brought together so that a face of one of the components is in abutment with a face of the other of the components. Relative reciprocatory movement between the components is caused to occur; as those faces are pressed together frictional heat is generated. When the temperature in the neighbourhood of the faces has reached a sufficiently high value, the heat-generating relative movement between the components is caused to cease and the components become welded together.

The mutually abutting faces of the components are normally planar, but that is not essential provided that the surfaces are so shaped that relative reciprocatory movement can occur between them without the surfaces parting one from the other during reciprocation.

During the generation of heat, material constituting parts of the components adjacent to the abutting faces becomes soft. Because the components are pressed together, some of the soft material is forced aside with the result that the components gradually move towards each other. That movement may continue for a short period after the heat-generating relative movement between the components has ceased. During that period the temperature falls, and any soft material remaining between the components is either forced aside or solidifies as the components become welded together. That gradual relative movement of the components towards each other will be referred to hereinafter as welding movement, while the relative movement serving to generate heat frictionally will be referred to hereinafter as heat-generating movement. It will be appreciated that welding movement occurs in a direction which is transverse to the direction or directions in which heat-generating movement occurs.

When reciprocatory friction welding is used to weld metal components together relatively large forces are usually involved. To simplify the application of those forces it has normally been the practice to arrange for one of the components to perform all of the heat-generating movement and for the other component to perform all of the welding movement but this can lead to problems which the present invention aims to overcome or at least to reduce.

From a first aspect the present invention consists in apparatus for use in welding a first component and a second component together by friction welding, comprising drive means operative to generate reciprocatory movement, a component holder operative to hold said first component, linking means operative to transmit reciprocatory movement from the drive means to the component holder so that in operation said first component performs reciprocatory heat-generating movement, pressure means operative to exert pressure on the component holder so that in operation said first component also performs welding movement the linking means being such as to accommodate that .welding movement during friction welding and the pressure means being such as to accommodate that heat-generating movement during friction welding.

Preferably the apparatus further comprises release means operative subsequent to friction welding to release the component holder from the drive means to enable the component holder to be withdrawn from the welded components.

The linking means may incorporate at least one hinged link to enable; it during friction welding to accommodate welding movement of the component holder. If such a hinged link is employed, however, it is necessary for the hinges to be pre-loaded to an extent sufficient to avoid backlash occurring during the heat-generating movement. To avoid that requirement, the linking means preferably comprises at least one flexible element which flexes to accommodate the welding movement. There are preferably a plurality of flexible elements; the elements may comprise rods or bars which can flex equally readily in any transverse direction; preferably, however, the elements comprise flexible blades which flex in one transverse direction but are stiff in direction at right-angles to that one transverse direction.

When the release means is provided it is preferably operative to disconnect the component holder from the drive means. The disconnection may take place at a location along the linking means and preferably takes place between the component holder and a portion of the linking means, such as one or more hinged links or one or more flexible elements, that during friction welding yields to accommodate welding movement of the component holder.

The component holder may be such as to hold said first component directly but preferably the component holder engages a fixture that in turn holds the component. By changing the fixture it is then possible to employ the same component holder to hold, on different occasions, first components of different shapes and sizes.

The pressure means preferably comprises ram means operative to apply force to a non-reciprocating head which is connected to the component holder through flexible connecting means enabling heat-generating movement of the holder to be accommodated. The connecting means may comprise one or more hinged links but preferably comprises one or more flexible elements. These flexible elements may comprise flexible rods or bars but preferably comprise flexible blades so orientated as to prevent movement of the component holder in a direction transverse to its heat-generating movement. Movement of the head in a direction parallel with the reciprocatory heat-generating movement of the component holder is preferably resisted by guide means which nevertheless permits the head with the component holder to perform welding movement. The guide means is preferably constituted by roller means preloaded to prevent backlash or rattling in use.

From a second aspect the present invention consists in first and second components welded together by means of apparatus in accordance with the first aspect of the present invention.

From a third aspect the present invention consists in a method of friction welding in which a first component is welded to a second component by reciprocatory friction welding at a welding, station, the first component performing both the necessary reciprocatory heat-generating movement and the necessary welding movement, the second component with the first component welded to it being moved bodily and a third component being welded to the second component by reciprocatory friction welding at said welding station, the third component performing both the necessary heat-generating movement and the necessary welding movement.

Additional components may be successively friction welded to the second component in the same manner, the second component being moved bodily with those components already welded to it before the next component is welded to it at said welding station.

The friction welding is preferably carried out with the aid of apparatus in accordance with the first aspect of the present invention.

The bodily movement of the second component preferably comprises rotational movement of the second component.

From a fourth aspect the present invention consists in components welded together by a method in accordance with the third aspect of the present invention.

Figures 2, 6:
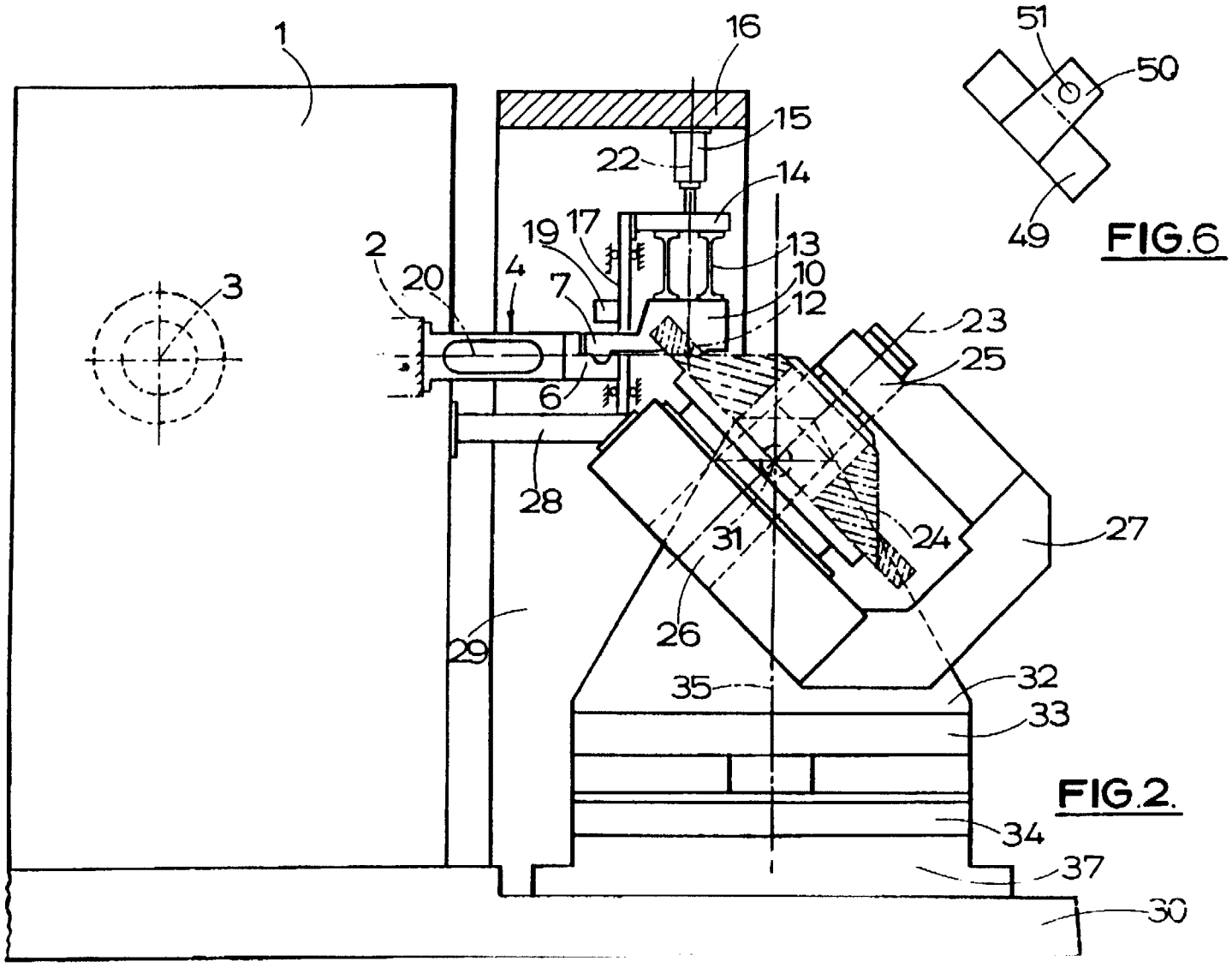
Figure 3:
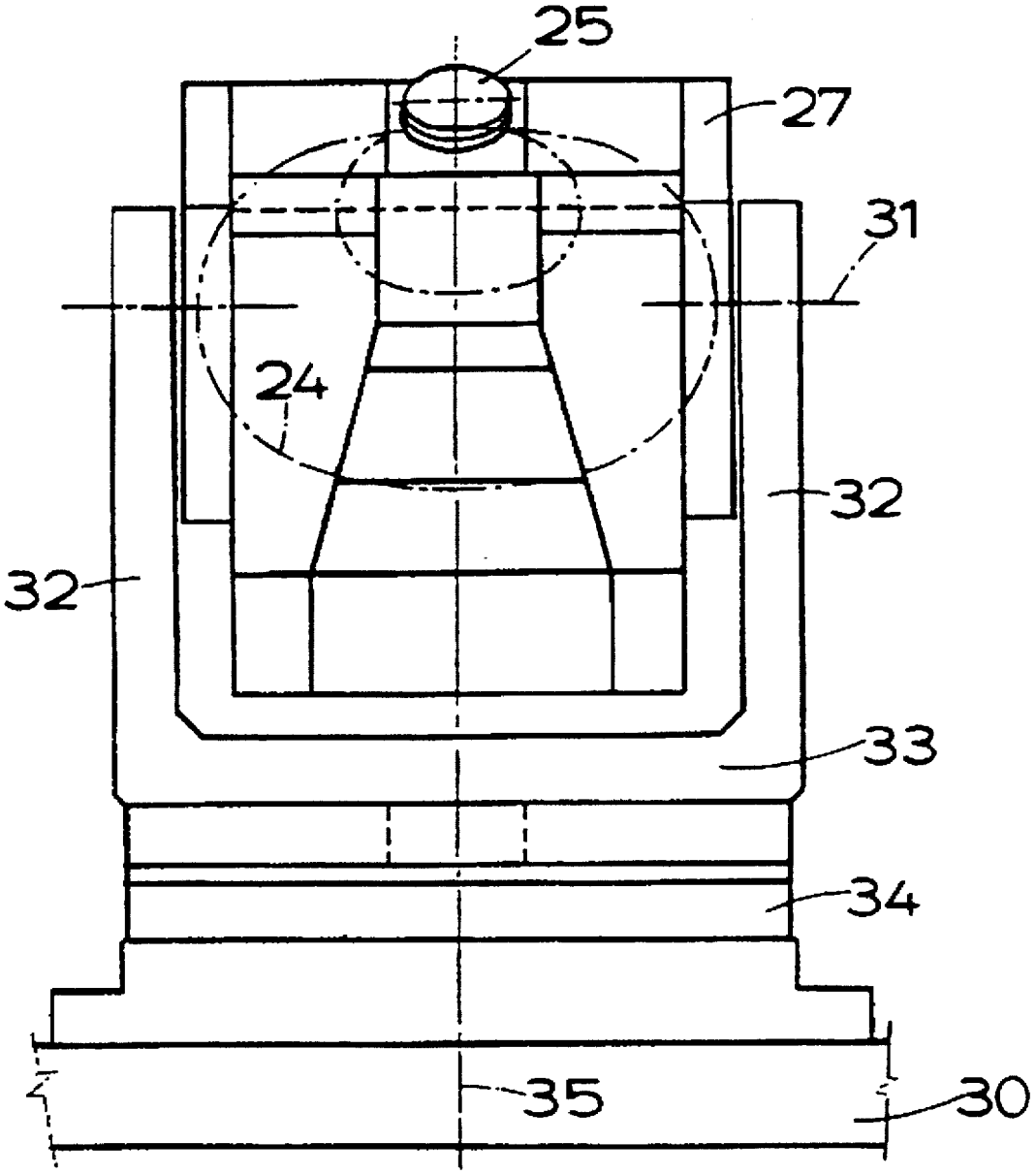
Figure 4:
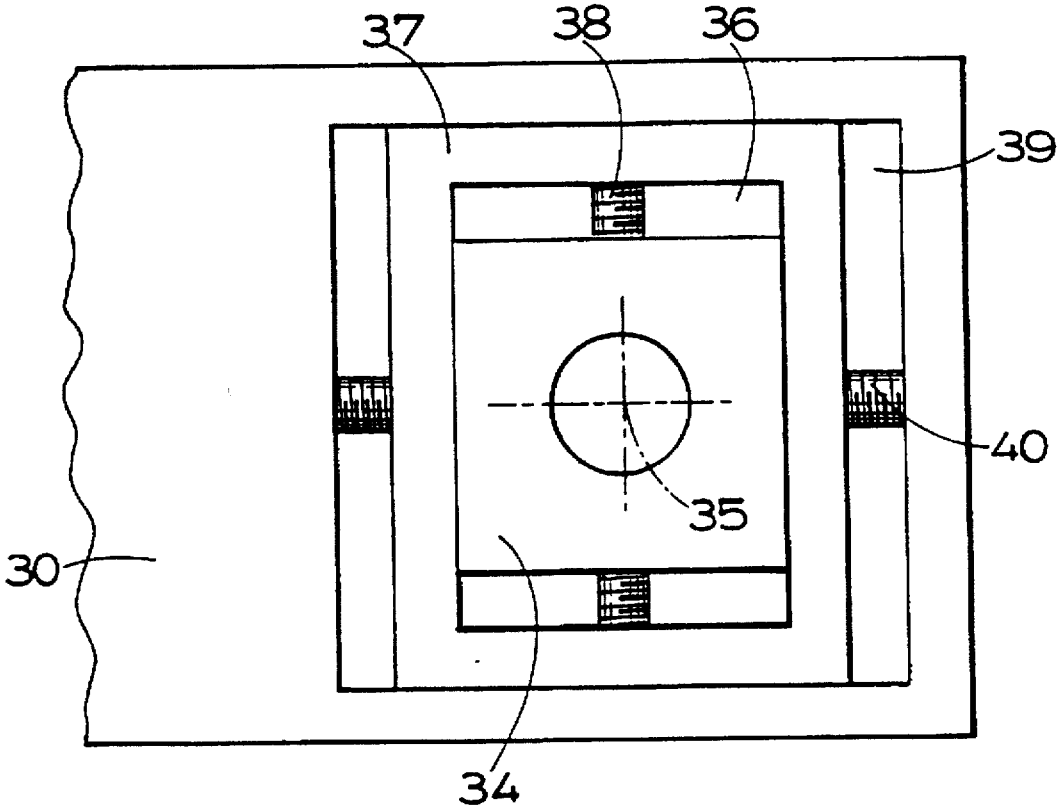
Figure 7:
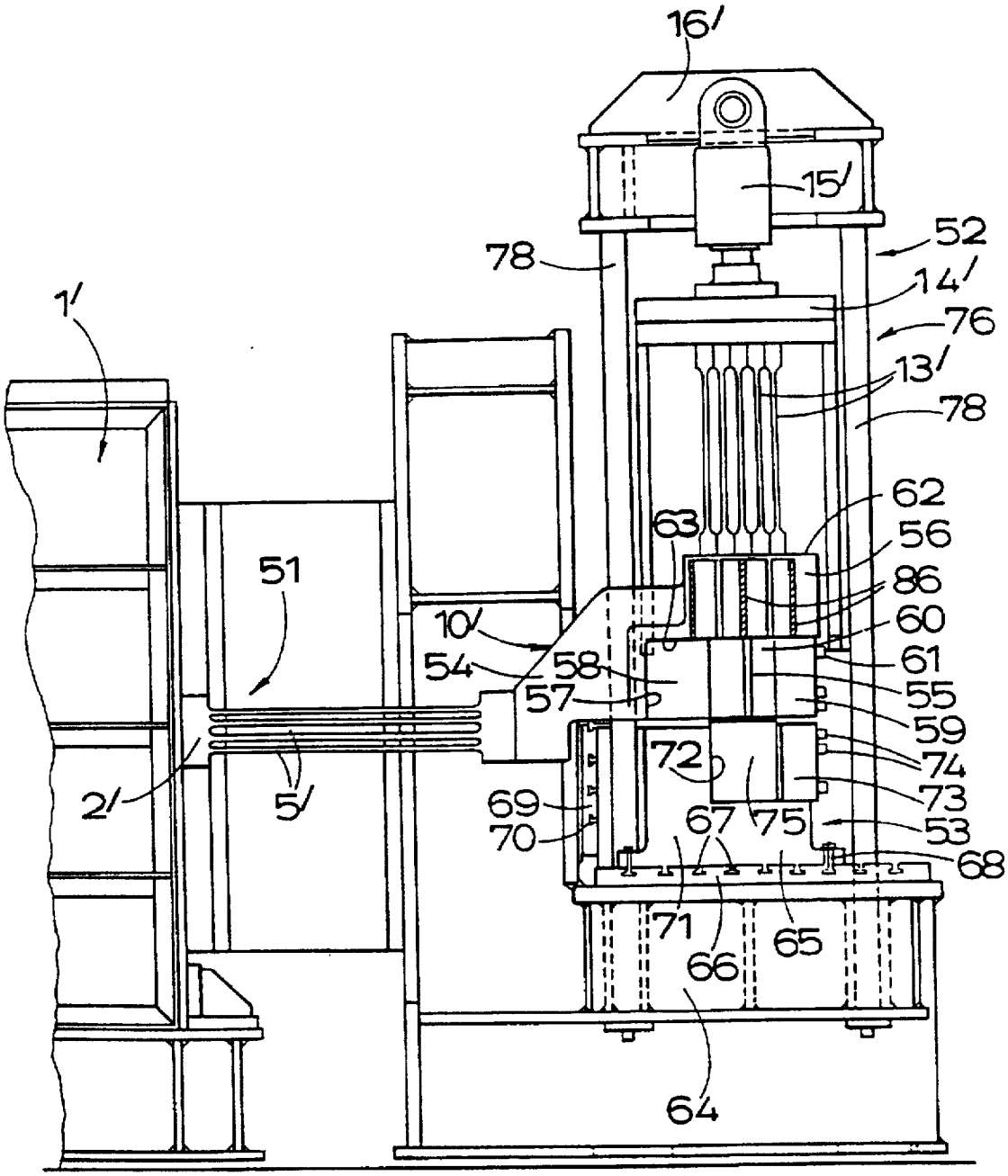
Figure 8:
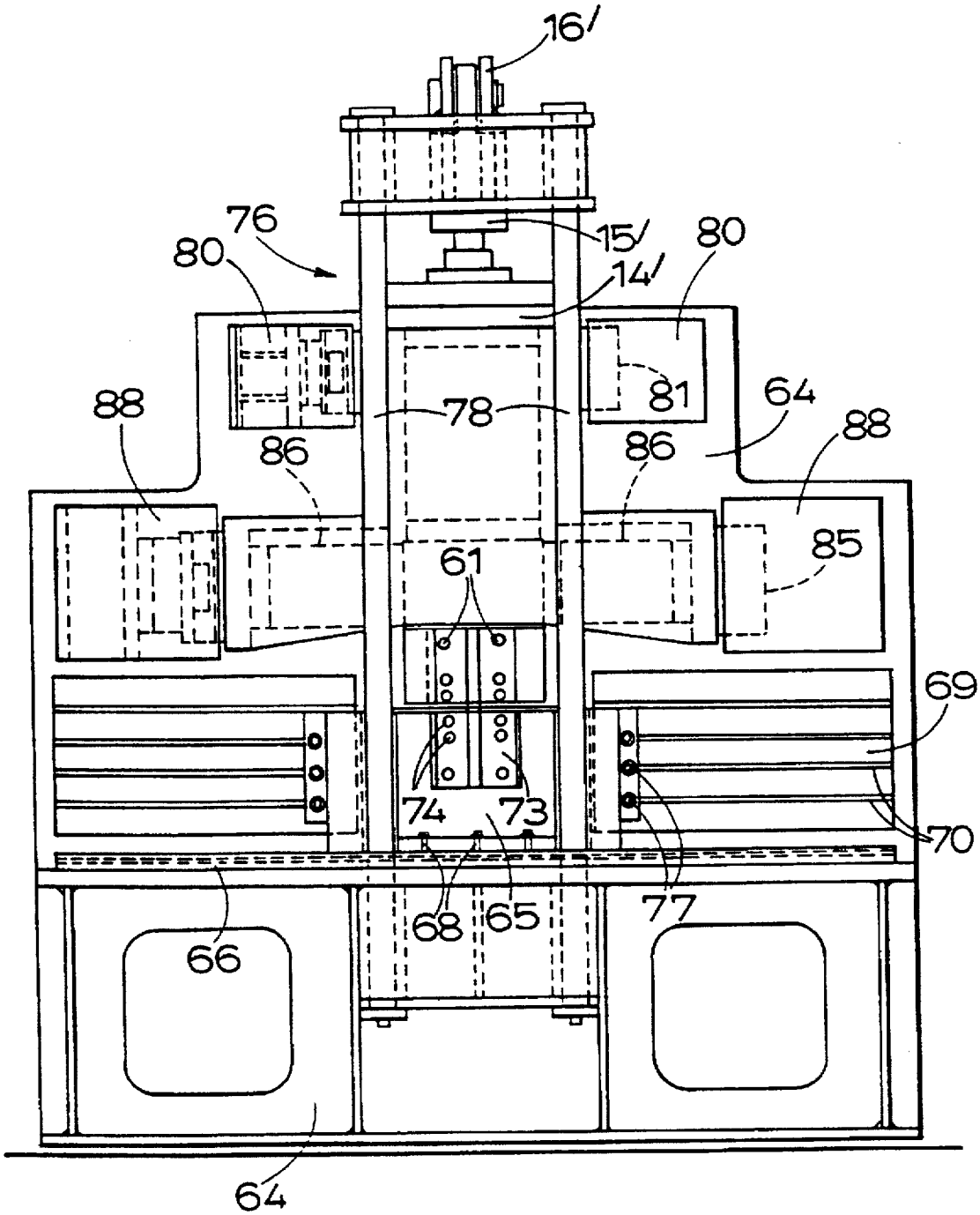
Figure 9:
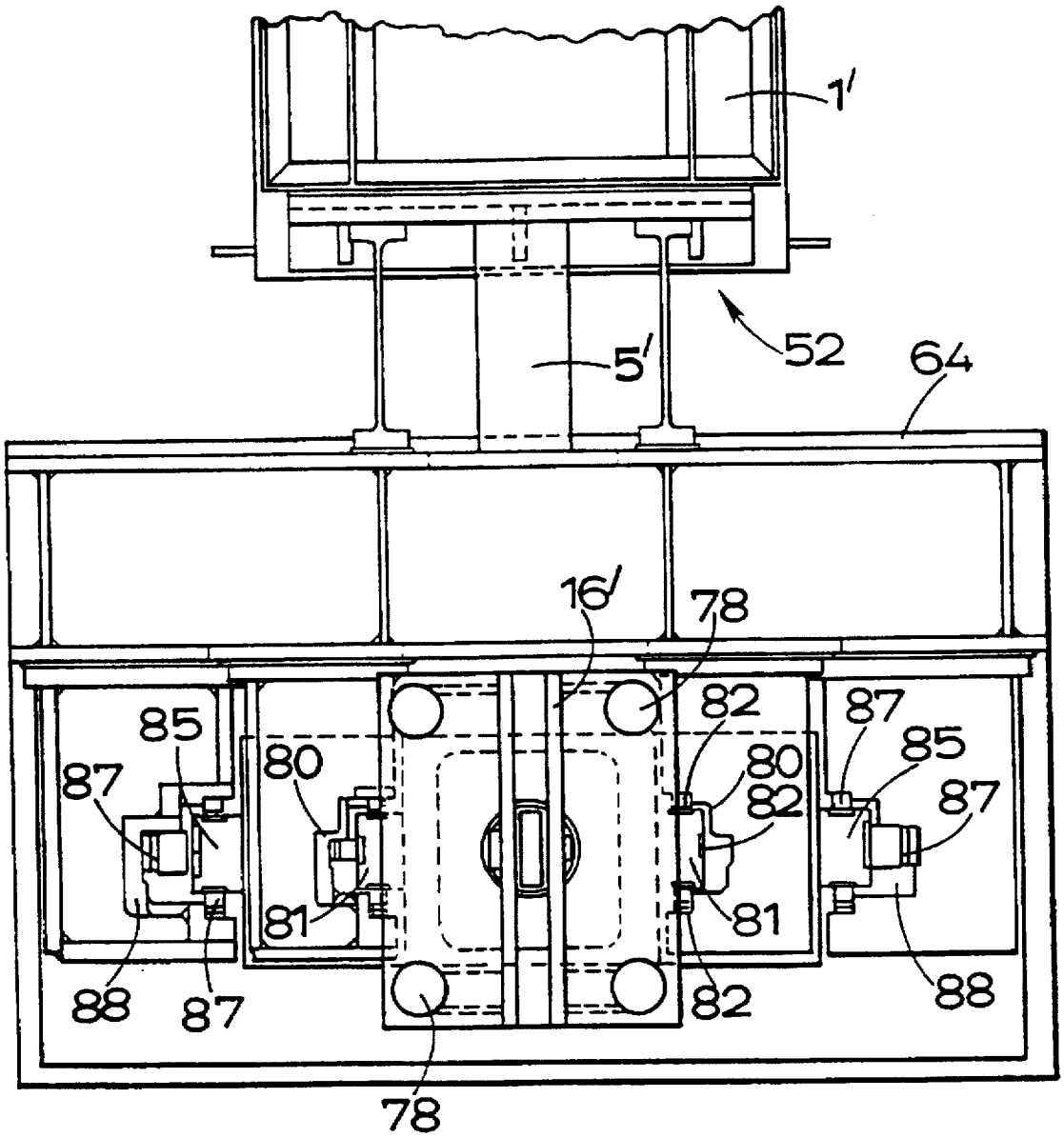

Embodiments of the present invention will now be described, by way of example only, with reference to the accompanying drawings, in which:

FIG. 1 is a somewhat diagrammatic side view of part of a first friction welding apparatus embodying the first aspect of the present invention, FIG. 2 is a somewhat diagrammatic side view to a smaller scale of the whole of the friction welding apparatus of which a part is shown in FIG. 1, FIG. 3 is a somewhat diagrammatic end view of the apparatus, as viewed from the right of FIG. 2, FIG. 4 is a schematic plan view of a device for incorporation in the apparatus shown in FIGS. 1 to 3, FIG. 5 is a simplified side view of an inner part of a turbine blade being welded to a rotor, FIG. 6 is a side view, to a smaller scale of an alternative form of carrier that can be used in place of a carrier shown in FIG. 2, FIG. 7 is a side view of second friction welding apparatus in accordance with the invention, certain parts being sectioned for clarity, FIG. 8 is a front view of the apparatus of FIG. 7, and FIG. 9 is a plan view of the apparatus of FIG. 7.

The apparatus illustrated in FIGS. 1 to 6 is designed for use in reciprocatory friction welding. The apparatus includes drive means 1 which is operative to cause reciprocation of an output member 2 in a horizontal direction. The drive means may comprise apparatus of the kind described and illustrated in the specification of British patent No. 2 199 783 of Allwood, Searle & Timney (Holdings) Limited. The axis of the rotary drive member of the apparatus is indicated at 3. Linking means 4 is firmly secured to a projecting end of the output member and comprises a metal bar of which a central part is machined away to leave a pair of flexible metal blades 5. A coupling socket 6 is firmly secured to the other end of the linking means 4 and is formed with an upwardly opening locating groove having inclined side walls. A coupling head 7 enters the groove from above and has inclined side walls which abut those of the locating groove. The coupling head 7 is releasably secured in the coupling socket by cap screws 8. The coupling head is integrally connected to a horizontally extending bar 9 which is in turn integrally connected with a component holder 10. A downwardly opening channel with vertically extending side walls is formed in the component holder 10 and houses a fixture 11 which locates a first one of the components to be welded together. No such component is shown in FIG. 1 but in FIG. 2 there is indicated the outline of a turbine blade 12 which constitutes the first component.

A pair of flexible metal blades 13 are firmly secured to the top of the component holder 10 and extend upwards to the underside of a head 14 to which they are also firmly secured. An hydraulic ram 15 is mounted vertically above the head and acts between the head and a fixed part 16 of the apparatus. The head is secured to an upper end part of a vertically extending guide bar 17 which is located between heavily loaded rollers 18 so disposed that it can move only in a vertical direction. A nut-runner 19 is mounted on the guide bar 16 and incorporates power-driven heads of polygonal cross-section which project from its underside and can engage the cap screws 8 to rotate them in either rotational direction. The nut-runner is mounted for vertical movement on the guide bar so that it can be moved between ah upper, disengaged position in which it is separated from the cap screws and a lower, engaged position in which it engages the cap screws. Suitable power-driven means is provided to shift the nut-runner to and fro along the guide bar between those positions as required.

The operation of that part of the apparatus shown in both of FIGS. 1 and 2 will now be described. At the start of the operation the drive means is inoperative to reciprocate the output member 2 and that output member is in a central position, that is in a position half way between the limits of its horizontal travel. The nut-runner 19 is lowered to its engaged position and is operated to unscrew the cap screws 8 so that the coupling head is no longer secured to the coupling socket. The ram 15 is then operated to raise the head 14, the blades 13 and the component holder 10 with the bar 9 and coupling head 7. A first component to be welded, such as a turbine blade, is mounted in a fixture 11 which is secured in the component holder 10. A second component, such as a turbine disc, to which the first component is to be welded, is located beneath the fixture, the second component having a planar surface lying on a horizontal centre plane of the output member 2, a plane indicated by the line 20. The ram 15 is operated to lower the head 14, blades 13 and component holder 10 until a planar, horizontal undersurface of the first component abuts the complementary planar surface of the second component in the plane 20, central portions of the abutting surfaces being traversed by the axis 21 of the ram 15. The arrangement is such that when this occurs the component holder 10 is disposed at a level a little higher than that illustrated, for example a few millimetres higher. The nut-runner 19 is lowered to its engaged position and operated to secure the coupling head 7 into the coupling socket 6. As the cap screws are tightened the blades 5 flex slightly. The nut-runner is then returned to its disengaged position.

The drive means 1 is caused to reciprocate the output member 2 horizontally, while the ram 15 is caused to exert a welding force which is transmitted to the first component. Reciprocation of the output member is transmitted to the first component by way of the coupling socket 6 and coupling head 7. Owing to the inclination of the side walls of the socket and head, the head is wedged tightly in the socket and any tendency there might otherwise be for the head to rattle in the socket is thereby avoided. As the component holder 10 reciprocates, the blades 13 flex. To avoid any tendency to fretting corrosion between the blades 13 and either the component holder 10 or the head 14 the blades are preferably secured to those parts in a manner such as that described in the specification of the aforementioned British patent No. 2 199 783 with reference to FIG. 8 thereof. The frictional resistance to the reciprocatory movement between the components to be welded together may well be considerable so that the output member may well have to exert a force of many tonnes, for example between fifteen and one hundred tonnes. Flexure of the blades 13 causes those blades to transmit to the head 14 horizontal reciprocatory forces but the magnitude of those forces is determined not by the frictional resistance between the first and second components but by the stiffness of the blades and the extent to which they are flexed. Reciprocation of the head 14, and of the guide bar 17 to which it is attached, is resisted by the rollers 18 which are loaded so as to bear on the guide bar with sufficient force to prevent any backlash or rattle occurring.

As the first component reciprocates relatively to the second component (which remains stationary) frictional heat is generated with the result that metal adjacent to the mutually abutting surfaces softens. Consequently some of that heated metal is expelled from between the components. At an appropriate moment the drive means is caused to cease reciprocation of the output member 2, the first component thus returning to a central position, half way between the limits of its former reciprocatory movement. Welding force continues to be exerted by the ram 15 while the components become welded together. The arrangement is preferably such that when welding has been completed the component holder 10 has moved downwards to substantially the position illustrated in which the blades 5 are no longer deflected. Consequently the final position of the first component is unaffected by any flexure of the blades 5.

The cycle of operation is then repeated, with the difference that when the component holder 10 is raised the first component necessarily remains unmoved, having been welded to the second component. It is also likely that the design of the fixture 11 will be such that it too remains with the first component. The vertical side walls of the fixture enable the component holder 10 to be raised from it. When the component has been raised clear of the fixture 11, the fixture is withdrawn from the first component and the second component is moved so as to bring another part of it to the welding station (that is a location centered on the point 22 where the axis 21 crosses the plane 20), or to enable a different second component to replace the initial one. A third component, similar to the first component is mounted in the fixture 11, or in a replacement fixture, and that fixture is mounted in the component head. The ram is operated to lower the third component onto the second component and welding then proceeds as described above.

The apparatus so far described preferably includes additional locating means that is not illustrated. That locating means serves to locate the component holder 10 against movement in any direction parallel with the plane 20 and traverse to the direction of reciprocation. The locating means conveniently comprises two pairs of flexible blades (not shown) each similar to the flexible blades 13. Inner ends of the blades are firmly secured to the component holder 10 as close as possible to the plane 20 though necessarily above that plane. The blades extend horizontally outwards from the component holder 10, and outer ends of the blades are firmly secured to spaced, vertical walls (not shown) side edges of which are anchored to the guide bar 17. The method of securement of the additional blades is preferably similar in each instance to that used for securing the blades 13 to the component holder 10 and the head 14. The blades of the additional locating means are so orientated that they can flex in a horizontal direction to permit the reciprocatory movement of the component holder during welding. When reciprocatory movement of the component holder occurs, the blades of the additional locating means flex. Consequently the overall length of each blade, as measured between the parallel planes of the end faces thereof, is very slightly reduced. As the maximum distance travelled by the component holder from its central position during reciprocatory movement is likely to be no more than a few millimetres, the consequent reduction in the overall length of the blades is immaterial; it may for example be approximately 0.02 mm. To accommodate that reduction the blades may stretch very slightly and/or the vertical walls may be drawn very slightly closer together. It will be appreciated that during welding, flexure of those additional blades causes reciprocatory forces to be applied to the guide bar 17 similar to those applied by the blades 13. The rollers 18 are sufficiently heavily loaded, however, to prevent backlash or rattle of the guide bar. It will also be appreciated that when the ram 15 is operated to raise or lower the component holder, the guide rod moves up or down in unison with the head so that the vertical walls also move up and down; the additional blades extending between the component holder and the walls therefore move up and down in unison with the head. The additional blades could alternatively be mounted on rollers similar to rollers 18 so as to be slidable up and down with the component holder.

The apparatus described above, whether or not it includes additional locating means of the kind described in the last preceding paragraph, may also include balancing means As described and illustrated in the specification of the aforementioned British patent No. 2 199 783, the drive means itself incorporates its own balancing means. If desired, that balancing means may be modified to balance some or all of the parts of the apparatus described above and that reciprocate when the output member 2 reciprocates. For example, the balancing means of the drive means may also serve to balance the linking means 4 and the coupling socket 6. Alternatively, or in addition, supplementary balancing means (not shown) may be provided to balance some or all of the reciprocatory parts described above and otherwise not provided with balancing means. The supplementary balancing means may, for example, serve to balance the linking means 4 and all the parts which in use are reciprocated by it and illustrated in FIG. 1. Alternatively the balancing means may, for example, merely serve to balance the coupling head 7 and all the parts which in use are reciprocated by it.

The supplementary balancing means preferably comprises counterweight means which is coupled to the reciprocating parts in such a manner that in whatever direction those parts are moving at any particular moment the counterweight means is moving in the opposite direction. To this end the counterweight means preferably comprises one or more counterweights coupled to the component holder 10, or some adjacent part, by a link or links pivoted at an intermediate location. The pivot is preferably attached directly or indirectly to the guide bar 17, the arrangement being such that in use, when the ram 15 is operated the counterweight means moves upwards or downwards, as the case may be, in unison with the guide bar, the head 14 and the component holder 10.

Counterweight means of this general kind has been provided not only in the drive means that is the subject of the aforementioned British patent No. 2 199 783 but also in other friction welding apparatus such as that which is the subject of British patent No. 1 414 454 of Allwood, Searle & Timney Limited; there, counterweights 46 are provided with links or bars 47 pivoted at their centres to fixed plates 48. Those counterweights are also provided with flexible and resilient elements 49 which exert restoring forces on the counterweights. Similar resilient elements may optionally be employed with the counterweights for use with the present apparatus.

It will be understood from the foregoing that while frictional heat is being generated and welding is being effected the second component remains stationary. Before further welding can take place at the welding station, however, the second component must be shifted so that the first component already welded to the second component is moved away from the welding station. FIG. 2 illustrates support means suitable for supporting the second component. The support means is illustrated as supporting a second component 24 constituting a rotor to which turbine blades 12 are to be friction welded. The rotor 24 has an axis 23; its outer surface is of generally conical shape but is formed with a plurality of slightly raised portions each of which is machined to afford a planar surface to which an associated blade can be welded. A set of those planar surfaces is arranged in a circle around the rotor, the surfaces being uniformly spaced apart around the rotor. There may be several sets of such planar surfaces each set being at a different axial location along the rotor.

As explained above, the mutually abutting faces of the first and second components at the welding station are horizontal. In order to bring each in turn of the planar surfaces on the rotor 24 into the horizontal plane 20 at the welding station it is necessary for the rotor to be rotated about its axis 23 while that axis is inclined at a predetermined angle to the horizontal. In the apparatus illustrated in FIG. 2 the rotor is mounted with its axis inclined to an appropriate angle. The rotor is supported between bearings 25 and 26 constituting part of a C-shaped carrier 27 and can be rotated about its own axis 23 in those bearings. Rotation of the rotor about that axis is effected by a numerically-controlled drive, and means are provided to lock the rotor in any desired position of adjustment.

When the apparatus is in use, turbine blades 12 are sequentially welded to a rotor so that a ring of uniformly spaced blades is secured to the rotor. During this sequential welding process, after each blade (except the last) has been welded in place and the component holder 10 has been raised, the rotor is rotated about its axis 23 through the angle necessary to bring the next planar surface on the rotor to the welding station.

During the frictional generation of heat, reciprocatory forces of considerable magnitude are transmitted from the turbine blade to the rotor. To assist in preventing consequential reciprocatory movement of the rotor, the carrier 27 is tied back to the drive means 1 by means of a horizontal component 28. It will also be appreciated that owing to the downward welding force exerted by the ram 15, a corresponding reaction force is exerted on the fixed part 16 of the apparatus. To withstand that reaction force the fixed part 16 is therefore preferably constitutes a transverse component of a bridge-like structure having spaced parallel uprights 29, one on either side of the welding station. The lower ends of the uprights are secured to a base 30 on which the apparatus is mounted.

The downward force exerted by the ram 15 is transmitted by the first component to the rotor 24 and thence through the carrier 27 to the base 30. It would be possible for the carrier to be mounted directly on the base, but in a preferred arrangement, such as that illustrated, the carrier is mounted in such a manner that its position can be varied so as to enable the apparatus to be used to friction-weld other sets of turbine blades to the rotor and to enable apparatus to be used with rotors of different designs.

The carrier 27 is mounted on a support for rotational adjustment about a horizontal axis 31 which is normal to a vertical plane containing the common axis of the bearings 25 and 26. To this end the carrier is provided with trunnions which enter horizontally aligned bearings in a pair of spaced, vertical walls 32 constituting part of the support. The walls 32, which are tapered upwards, as illustrated are fixed to a plate 33 which also constitutes part of the support and which is in turn mounted on a bearer 34. The supporting plate 33 is rotatable about a vertical axis 35 relative to the bearer. The bearer 34 itself can be moved horizontally, without rotation, relative to the base, the mechanism for effecting this being shown schematically in FIG. 4. The bearer 34 is of rectangular shape in plan and is located in a rectangular opening 36 in a frame 37. The length of the opening 36 is the same as that of the bearer 34 but the width of the opening is greater than that of the bearer. The bearer 34 can be shifted widthwise of the frame by screw mechanism 38. Similarly the frame 36 is located in a rectangular opening 39 in the base 30. The width of the opening 39 is the same as that of the frame 37 but the length of the opening is greater than that of the frame. The frame, with the bearer, can be shifted lengthwise of the base by screw-mechanism 40. Rotation of the carrier 27 about the horizontal axis 31 and the vertical axis 35 is effected by suitable numerically-controlled motors. Similarly, operation of the screw mechanism 38 and 40 is also effected by similar numerically-controlled motors. As the combined weight of the rotor 24, carrier 27, support 32, 33, and bearer 34 is likely to be relatively large, it is preferred to include means (not shown) to introduce pressurised air beneath the bearer 34 and the frame 37 during operation of the screw mechanism 38 and 40 so as to reduce the frictional forces resisting horizontal movement of the bearer and the frame. When the bearer has been shifted to any desired position of adjustment the flow or pressurised air is caused to cease and the bearer is clamped in position by clamping means (not shown).

It will be appreciated that the support means for supporting the second component could be used independently of the particular structure described for moving the first component. The support means could be used with any suitable arrangement for producing welding movement and heat generating movement of the first component.

Figure 5:
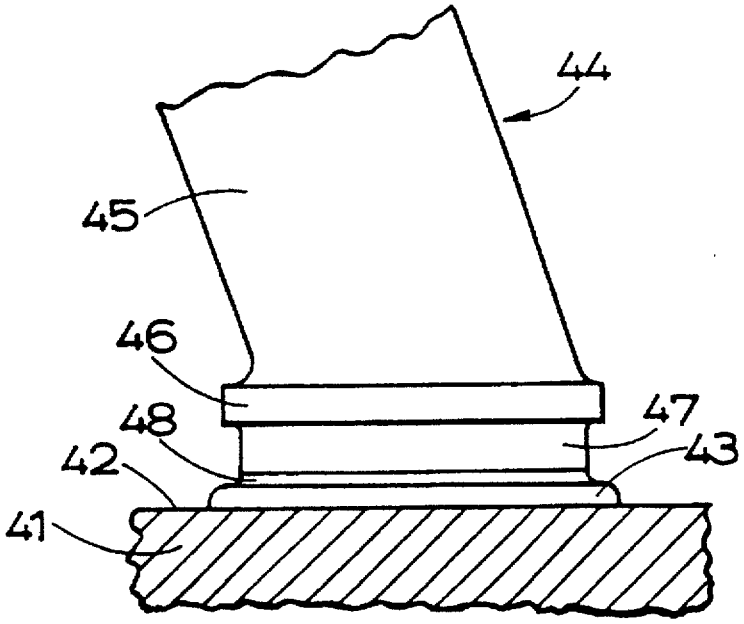

In FIG. 5 there is shown, in simplified form, a small part of a rotor 41 with a conical outer surface 42 formed with a raised portion 43, which is one of a set of such portions spaced uniformly around the rotor. The outer surface of the raised portion is planar and is in the shape of a rectangle or a parallelogram with its length considerably greater than its width. Part of a turbine blade 44 is also shown, this having a main operative portion 45 or arcuate profile in section and at its lower end flaring outwards to a base portion 46 of substantially the same shape in plan as the planar surface of the raised portion 43. Below the base portion 46 the blade is formed with an attachment portion 47 of slightly smaller cross-section than the base portion 46 and, like the base portion, in the shape of a rectangle or parallelogram. When welding is to start, a planar lower surface of the attachment portion 47 is brought into abutment with the outer surface of the raised portion 43, the surfaces being substantially of the same shape and dimensions. In order to bring about the frictional generation of heat the blade is reciprocated in a direction parallel with the longitudinal axis of the mutually abutting surfaces. During the frictional generation of heat a zone 48 at the lower end of the attachment portion becomes soft or fluid and is squeezed laterally so that the height of the attachment portion is progressively reduced.

In some sets of raised portions, the longitudinal axis of each such portion lies in a plane that also contains the rotational axis of the rotor. When that is the case the rotor is disposed in a manner similar to that shown in FIGS. 2 and 3. In other arrangements, however, the longitudinal axis of each such portion is inclined so as to approximate to a short length of a notional spiral or helix extending over the conical surface of the rotor. When that is the case the carrier must first be rotated about the vertical axis 35 in order to bring the longitudinal axes of the mutually abutting surfaces into alignment with the direction of reciprocatory movement of the component holder 10.

In welding turbine blades made from a titanium alloy to a rotor for an aircraft engine, the apparatus may be such that the maximum length of travel of the output member 2 during reciprocatory movement is about 6 mm (that is the maximum length of travel from the central position is about 3 mm); the force that can be exerted by the output member may be between fifteen and one hundred tonnes; the maximum force that can be exerted by the ram 15 is also between fifteen and one hundred tonnes, the force preferably being substantially equal to the force that can be exerted by the output member; in the course of the welding operations the turbine blade may move downwards through a distance of a few millimetres, for example about six millimeters. Those figures are given solely by way of example and are in no way limiting to the scope of the invention.

In addition to its use in the initial manufacture of bladed rotors for turbines the apparatus and method may be used in the repair of bladed rotors, broken or damaged blades being replaced by new blades which are friction welded into place.

The apparatus may, or course, be used for welding other types of components together. In place of the carrier 27 there may be provided a carrier of the kind shown in FIG. 6. That carrier has a base plate 49 to which a second component can be secured and spaced side arms 50 provided with aligned trunnions for engagement in the bearings in the wall 32.

Whether using the carrier 27 or the carrier shown in FIG. 6, it may be desirable to provide some form of load transmitting means between the carrier and the supporting plate 33, after any necessary adjustments of the carrier have been effected, so that in use at least part of the force applied to the second component by the ram 15 is transmitted, to the supporting plate 33 and thence to the base 30 by way of that load transmitting means rather than by way of the trunnions and the bearings in the walls 32. The load transmitting means may comprise a block or a stack of blocks of appropriate thickness or it may comprise jack means of adjustable height.

Moreover, in order to enable the height of the second component to be adjusted so as to enable the face of the second, component to be brought into the plane 20, the plate 33 may be raised or lowered relative to the bearer 34. Packing of a suitable thickness may be provided for this purpose. In theory it might be desirable to provide a power-driven numerically controlled screw-mechanism for adjusting the height of the support but as the force applied by the ram 15 would be transmitted through that mechanism, during welding, it may well be impracticable to provide such mechanism in apparatus in which the ram exerts a large force.

It will be appreciated that any adjustment of the position of the carrier can be carried out only after the strut 28 has been removed and that when the carrier is in a new position of adjustment a new component 28 of appropriate dimensions is required of the carrier is again to be tied back to the drive means.

The supporting device described above is capable of universal adjustment in that the second component can be rotated independently about three axes, 23, 31 and 35, that are transverse to each other and can be moved independently in any of three directions of right-angles to one another, that is in horizontal directions by operation of the device shown in FIG. 4 and vertically by bodily movement of the support relative to the bearer 34. This universal adjustment is valuable in that it enables the apparatus to be used for friction welding together components of a wide variety of shapes and sizes. Nevertheless it will be appreciated that special-purpose apparatus embodying the invention may be such that facilities for adjustment in one or more of those three rotational and/or three translation manners are omitted.

It will also be appreciated from the foregoing that the invention stems from a recognition that it is desirable for the drive means to remain fixed and for the second component to remain stationary during each welding operation and to be moved as little as possible between successive welding operations. The provision of release means operative between the component holder and the output member of the drive means, and in accordance with present invention, much assists in achieving these aims. However, if the linking means is able to accommodate the movement of the component holder necessary to release a welded first component from the component holder and introduce a subsequent first component into the component holder then the release means may not be necessary.

It is to be understood that numerous modifications can be made without departing from the scope of the present invention. For example, a different form of drive means could be used in place of that described above. Furthermore the apparatus may be orientated differently so that the direction of reciprocatory movement is not horizontal; it may, for example, be vertical in which case it may be convenient for the welding station to be situated above the drive means.

The apparatus illustrated in FIGS. 7 to 9 is a second friction welding apparatus of similar general construction to the first apparatus illustrated in FIGS. 1 to 6, and similar reference numerals have been given to similar components but primes have been added to distinguish them from the reference numerals of FIGS. 1 to 6. The apparatus comprises heat-generating movement means 51, welding movement means 52, a component holder 10' coupled to the heat-generating and welding movement means 51 and 51 and adapted to hold a first component to be welded to a second component, and a second component holder 53.

The heat-generating movement means 51 comprises drive means 1' which is operative to cause horizontal reciprocation of an output member 2' which is connected to the component holder 10' by a plurality of flexible metal blades 5' comprising linking means. The blades 5' are machined from a single piece of metal.

The welding movement means 52 comprises a hydraulic ram 15' acting between a fixed part 16' of the frame and a head 14'. Flexible metal blades 13' connect the head 14' to a portion of the component holder 10'.

The component holder 10' comprises a body 54 which transfers the heat-generating movement to the first component (referenced as number 55), a part 56 of the body extends above the first component and serves to transfer the welding movement to the first component. The body 54 has a vertical face 57 against which a packing block 58 is urged by a jaw 59 of the component holder. The first component 55 is itself rigidly mounted in a fixture 60 clamped between the face 57 and the jaw 59 by screws 61.

The part 56 of the body 54 has an upper surface 62 to which the blades 13' are secured and a lower surface 63 which in use bears against the fixture 60.

The holder 53 for the second component is mounted on a rigid main frame 64 and comprises a carriage 65 slidably mounted on a horizontal plate 66 fixed to the main frame 64. The plate 66 has an array of parallel T-section slots 67 formed in its upper surface and the carriage 65 can be releasably bolted to the plate by suitable shaped bolts 68. A vertical plate 69 with T-section slots 70 is also fixed to the main frame 64 and the carriage 65 is releasably bolted to it by bolts 77. The carriage 65 comprises a main body 71 of L-shaped cross-section (best seen in FIG. 7), having a vertical face 72, and a jaw 73 connected to the body by screws 74 thus enabling a second component 75 to be releasably clamped to it. The second component may be mounted in a fixture similar to the fixture 60.

A reaction frame 76 is provided to transmit the reaction from the welding force to the frame 64. The frame comprises the part 16' of the frame and four vertical tie bars 78. The upper ends of the tie bars are connected to the part 16' and the lower ends to the main frame 64.

The head 14' is able to move vertically but is restrained from movement in horizontal directions. This restraint is achieved by two fixed vertical channels 80 fixed to the frame 64 and opening towards each other on opposite sides of the head. Blocks 81 fixed to the head project into the channels. Each block carries three rollers 82 which engage the inside faces of the channels and rotate about their axes when the head moves up and down.

The part 56 of the body 54 is able to move vertically and horizontally in the direction necessary to cause the generation of heat; it is however, restrained from moving sideways. The restraint is achieved by flexible metal blades 86 which extend horizontally. Inner ends of the blades are anchored to the part 56 while outer ends thereof are anchored to blocks 85 similar to the blocks 81. Each block 85 carries three rollers 87, like the rollers 82, which engage the inside faces of fixed vertical channels 88 similar to the channels 80. For clarity these restraining means are not shown in FIG. 7 (apart from the blades 86 which are there shown in section).

The generation of frictional heat for welding is carried out in much the same manner as that described above with reference to FIGS. 1 to 6. FIGS. 7 to 9 show the apparatus at the moment of welding. The blade 5' are in horizontal planes and are undeflected, the output member 2' having stopped reciprocating. The ram 15' is exerting a welding force to urge the first component 55 against the second component 75.

After welding has been completed the screws 61 are released to slacken the grip of the jaw 59 on the first component and the ram 15' is actuated to lift the component holder clear of the welded components. As this occurs the blades 5' flex and the head 14' and the part 56 are guided for vertical movement by the guide channels and blocks described above. When the portion 56 is sufficiently clear of the first component the bolts 68 and 77 are slackened and the carriage 65 is slid horizontally away from its welding position to the left or right as viewed in FIG. 8. The screws 74 are then released and the welded components are either removed and replaced with a subsequent component or re-positioned for a subsequent welding operation.

It will be appreciated that since the jaw 59 moves in such a manner as to release the first component 55 for movement in the horizontal direction in which the carriage 65 slides, there need not be much, if any, raising of the body 54 to allow the first component to move free of component holder 10'.

In a modified construction (not illustrated) the fixed part 16' is fixed to an upward extension of the main frame 64. The main frame 64 and fixed part 16' are then generally C-shaped in side view. The tie bars 78, or at least some of them, may then be omitted.

I claim:

1. Apparatus for use in welding a first component and a second component together by friction welding, comprising drive means operative to generate reciprocatory movement, a component holder operative to hold said first component, linking means operative to transmit reciprocatory movement from said drive means to said component holder so that in operation said first component performs reciprocatory heat-generating movement, pressure means operative to exert pressue on said component holder so that in operation said first component also performs welding movement, said pressure means being such as to accommodate the heat-generating movement during friction welding, and wherein said linking means comprises at least one flexible element which is alternately in compression and in tension as it transmits said reciprocatory movement from said drive means to said component holder and which bends or flexes to accommodate the welding movement of said component holder during friction welding.

2. Apparatus according to claim 1 wherein release means is provided, said release means being operative subsequent to friction welding to release said component holder from said drive means.

3. Apparatus according to claim 2 wherein said release means is operative to disconnect said component holder from said linking means.

4. Apparatus according to claim 1 wherein said pressure means comprises ram means operative to apply force to a head which is connected to said component holder through flexible connecting means which enables reciprocatory heat-generating movement of the component holder to be accommodated.

5. Apparatus according to claim 4 wherein said component holder is restrained against movement transverse to said heat-generating movement and said welding movement by flexible restraining means extending between said component holder and restraining means movable only in said direction of welding movement.

6. Apparatus for use in welding a first component and a second component together by friction welding, comprising drive means operative to generate reciprocatory movement, a component holder operative to hold said first component, linking means operative to transmit reciprocatory movement from said drive means to said component holder so that in operation said first component performs reciprocatory heat-generation movement, pressure means operative to exert pressure on said component holder so that in operation said first component also performs welding movement, said linking means being such as to accommodate said welding movement during friction welding, and said pressure means being such as to accommodate said heat-generating movement during friction welding, and wherein flexible restraining means is provided extending between said component holder and movable restraining means, said movable restraining means being movable only in the direction of said welding movement, said component holder being restrained against movement transverse to said heat-generating movement by said flexible restraining means.

* * * * *